(12) United States Patent
Cao et al.

(10) Patent No.: US 12,160,167 B2
(45) Date of Patent: Dec. 3, 2024

(54) SHORT-CIRCUIT PROTECTION APPARATUS, SHORT-CIRCUIT PROTECTION METHOD FOR TARGET CIRCUIT, AND POWER CONVERSION DEVICE

(71) Applicant: Huawei Digital Power Technologies Co., Ltd., Shenzhen (CN)

(72) Inventors: Zhen Cao, Shanghai (CN); Jie Kong, Shenzhen (CN); Zhong Wang, Shanghai (CN); Tao Zhang, Shanghai (CN); Tao Shi, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 17/939,260

(22) Filed: Sep. 7, 2022

(65) Prior Publication Data

US 2023/0076274 A1   Mar. 9, 2023

(30) Foreign Application Priority Data

Sep. 7, 2021   (CN) .......................... 202111045401.5

(51) Int. Cl.
*H02M 1/32* (2007.01)
*H02H 1/00* (2006.01)
(Continued)

(52) U.S. Cl.
CPC ............ *H02M 1/32* (2013.01); *H02H 1/0007* (2013.01); *H02H 7/1213* (2013.01); *H02H 7/1227* (2013.01)

(58) Field of Classification Search
CPC ..... H02M 1/32; H02H 1/0007; H02H 7/1213; H02H 7/1227; H02H 3/087; H02H 3/243;
(Continued)

(56) References Cited

U.S. PATENT DOCUMENTS 3,504,191 A * 3/1970 Rodewald .............. H03K 3/537
307/108
5,187,631 A * 2/1993 Baylac ..................... H02H 1/04
327/365
(Continued)

FOREIGN PATENT DOCUMENTS

CN   106410757 A  *  2/2017  ............... H02H 7/12
CN   113296028 A     8/2021
(Continued)

*Primary Examiner* — Dharti H Patel
(74) *Attorney, Agent, or Firm* — Conley Rose, P.C.

(57) ABSTRACT

A short-circuit protection apparatus includes a first detection branch, a second detection branch, and a controller. The first detection branch includes a first sampling resistor and a first sampling capacitor that is connected in parallel to the first sampling resistor. A difference between an absolute value of a second sampling voltage and an absolute value of a first sampling voltage is a first difference. The controller obtains a comparison result between an absolute value of a first sampling voltage at two terminals of the first sampling resistor and an absolute value of a second sampling voltage at two terminals of the second sampling resistor, and if a difference between the absolute value of the second sampling voltage and the absolute value of the first sampling voltage is a second difference and the second difference is less than the first difference, controls the target circuit to stop working.

20 Claims, 10 Drawing Sheets

(51) Int. Cl.
*H02H 7/12* (2006.01)
*H02H 7/122* (2006.01)

(58) Field of Classification Search
CPC .......... H02H 7/1255; H02H 3/00; H02H 3/08; H02H 3/26; H02H 7/10
USPC ....................................................... 361/93.7
See application file for complete search history.

(56) References Cited

U.S. PATENT DOCUMENTS

| | | | | |
|---|---|---|---|---|
| 2006/0203399 | A1* | 9/2006 | Faccin | H05B 39/045 |
| | | | | 361/15 |
| 2015/0318690 | A1* | 11/2015 | Eckel | H02M 7/4835 |
| | | | | 361/93.1 |
| 2015/0333509 | A1* | 11/2015 | Jankowski | H02H 7/042 |
| | | | | 361/35 |
| 2017/0047837 | A1 | 2/2017 | Ermisch et al. | |

FOREIGN PATENT DOCUMENTS

| | | | | |
|---|---|---|---|---|
| CN | 113376435 A | * | 9/2021 | |
| CN | 113937725 A | * | 1/2022 | ........... H02H 1/0007 |
| DE | 3421520 A1 | | 12/1985 | |
| EP | 3117511 B1 | | 12/2020 | |
| WO | WO-2015161893 A1 | * | 10/2015 | ........... G01R 19/165 |

\* cited by examiner

SHORT-CIRCUIT PROTECTION APPARATUS, SHORT-CIRCUIT PROTECTION METHOD FOR TARGET CIRCUIT, AND POWER CONVERSION DEVICE

CROSS-REFERENCE TO RELATED APPLICATION

This claims priority to Chinese Patent Application No. 202111045401.5 filed on Sep. 7, 2021, which is hereby incorporated by reference in its entirety.

TECHNICAL FIELD

This disclosure relates to the field of electronic circuit technologies, and in particular, to a short-circuit protection apparatus, a short-circuit protection method for a target circuit, and a power conversion device.

BACKGROUND

A power electronic component, such as a metal-oxide semiconductor (MOS) field-effect transistor (FET) (MOSFET) and an insulated-gate bipolar transistor (IGBT), has a fast conduction speed, a low switching loss, and high energy density, but has a low withstand voltage capability and a low over-current capability. When being damaged, the power electronic component may be short-circuited or open-circuited, and a system accident easily occurs and is escalated. These limits further application of the power electronic component. If two energized terminals of a power source such as a battery or a capacitor are shorted-circuited, a short-time high current is generated. This may damage the power electronic component or another subcomponent, or may even cause a fire or explosion in a severe case.

A short-circuit protection for MOSFETs S1 and S2 is mainly implemented by using a short-circuit protection apparatus shown in FIG. 1. As shown in FIG. 1, the short-circuit protection apparatus includes a resistor R1 that is connected in series to S1 and an operational amplifier that is separately connected to two terminals of R1 through resistors R11 and R12. When S1 and S2 are short-circuited, a voltage at the two terminals of the R1 is increased as short-circuit current is increased, and an output voltage Vo of the operational amplifier is accordingly increased. Whether S1 and S2 are short-circuited may be detected by determining whether the output voltage Vo of the operational amplifier reaches a preset output voltage protection value. However, because the circuit includes an inductor L that is connected in series to the battery, and an inductance value of L affects an increase in the short-circuit current, resulting that the short-circuit protection may not be quickly performed. Therefore, applicability is poor.

SUMMARY

This disclosure provides a short-circuit protection apparatus, a short-circuit protection method for a target circuit, and a power conversion device, to quickly rectify a short-circuit fault in a timely manner, so that the target circuit can be effectively protected, and applicability is high.

According to a first aspect, this disclosure provides a short-circuit protection apparatus. The short-circuit protection apparatus includes a first detection branch, a second detection branch, and a controller. The first detection branch is connected in parallel to a first terminal and a second terminal of a target circuit, and the second detection branch is connected in parallel to the first terminal and the second terminal of the target circuit. The first detection branch includes a first sampling resistor and a first sampling capacitor that is connected in parallel to the first sampling resistor. The second detection branch includes a second sampling resistor. When the target circuit is working, a difference between an absolute value of a second sampling voltage at two terminals of the second sampling resistor and an absolute value of a first sampling voltage at two terminals of the first sampling resistor is a first difference. The controller obtains a comparison result between the absolute value of the first sampling voltage at the two terminals of the first sampling resistor and an absolute value of the second sampling voltage at the two terminals of the second sampling resistor, and if the difference between the absolute value of the second sampling voltage and the absolute value of the first sampling voltage is a second difference and the second difference is less than the first difference, controls the target circuit to stop working. When the first terminal and the second terminal of the target circuit are short-circuited, a decrease in voltage at two terminals of the target circuit is faster than an increase in short-circuit current. Therefore, a short-circuit fault can be quickly rectified in a timely manner, so that the target circuit may be effectively protected, and applicability is high.

With reference to the first aspect, in a first possible implementation, the second detection branch further includes a second sampling capacitor, the second sampling capacitor is connected in parallel to the second sampling resistor, and a capacitance value of the second sampling capacitor is less than that of the first sampling capacitor. A spike voltage in the second sampling voltage may be filtered by using the second sampling capacitor, to prevent short-circuit protection from being mistakenly triggered by a decreased spike voltage. This improves accuracy of performing the short-circuit protection by the short-circuit protection apparatus, and improves stability of a working device in which the target circuit and the short-circuit protection apparatus (such as a power conversion device) are disposed.

With reference to the first aspect, in a second possible implementation, the first detection branch includes two resistors that are connected in series, the two resistors that are connected in series in the first detection branch further include a third sampling resistor, one terminal of the third sampling resistor is connected to the first terminal of the target circuit and one terminal of the second sampling resistor, and the other terminal of the first sampling resistor is connected to the second terminal of the target circuit and the other terminal of the second sampling resistor. Whether the two terminals of the target circuit are short-circuited may be detected by using only three resistors and one capacitor. Therefore, a circuit structure is simple, costs of the circuit may be reduced, and the applicability is high.

With reference to the first aspect, in a third possible implementation, the second detection branch includes two resistors that are connected in series, the two resistors that are connected in series in the second detection branch further include a fourth sampling resistor, the first terminal of the target circuit is connected to the second terminal of the target circuit by using the fourth sampling resistor and the second sampling resistor, and a ratio of a resistance value of the fourth sampling resistor to a resistance value of the second sampling resistor is less than or equal to a ratio of a resistance value of the third sampling resistor to a resistance value of the first sampling resistor. Therefore, when the target circuit is working, in other words, the first terminal and the second terminal of the target circuit are not short-circuited, the second sampling voltage at the two terminals of the second sampling resistor is greater than or equal to the first sampling voltage at the two terminals of the first sampling resistor. Further, after the fourth sampling resistor is added to the second detection branch, a difference between the first sampling voltage and the second sampling voltage may be changed based on an actual requirement by changing resistance values of four resistors in the first sampling resistor to the fourth sampling resistor. This can improve flexibility.

With reference to the first aspect, in a fourth possible implementation, the short-circuit protection apparatus further includes a comparator. A first input terminal of the comparator is configured to collect the first sampling voltage at the two terminals of the first sampling resistor, a second input terminal of the comparator is configured to collect the second sampling voltage at the two terminals of the second sampling resistor, and an output terminal of the comparator is connected to the controller. The comparator is configured to output a first level signal when the first sampling voltage is less than the second sampling voltage, and output a second level signal when the first sampling voltage is greater than or equal to the second sampling voltage. The controller obtains a level signal that is output by the comparator, and when the level signal that is output by the comparator is the second level signal, controls the target circuit to stop working. The comparison result between the first sampling resistor and the second sampling resistor may be obtained by obtaining the level signal that is output by the comparator, to reduce a calculation amount of the controller and improve processing efficiency.

With reference to the first aspect, in a fifth possible implementation, after a preset duration elapses if the difference between the absolute value of the second sampling voltage and the absolute value of the first sampling voltage is the second difference, the controller obtains the comparison result between the absolute value of the first sampling voltage at the two terminals of the first sampling resistor and the absolute value of the second sampling voltage at the two terminals of the second sampling resistor at a first moment. If the difference between the absolute value of the second sampling voltage and the absolute value of the first sampling voltage is a third difference and the third difference is less than the first difference, the controller controls the target circuit to stop working, and prevents, by delaying, the short-circuit protection from being mistakenly triggered by the decreased spike. This improves the accuracy of performing the short-circuit protection by the short-circuit protection apparatus, and improves the stability of the working device in which the target circuit and the short-circuit protection apparatus (such as the power conversion device) are disposed.

With reference to the first aspect, in a sixth possible implementation, the target circuit includes a power supply and one switching device that is coupled to two terminals of the power supply or a plurality of switching devices that are connected in series. The power supply includes a direct current source or a capacitor. An explosion of the power supply caused when the two terminals of the target circuit is short-circuited may be prevented by performing the short-circuit protection for the target circuit, to improve reliability and safety of the device in which the target circuit (for example, the power conversion device) is disposed.

With reference to the first aspect, in a seventh possible implementation, when the target circuit includes the one switching device or the plurality of switching devices that are connected in series, the switching device in the target circuit may be off, to control the target circuit to stop working.

With reference to the first aspect, in an eighth possible implementation, the switching device includes a power tube, a relay, or a contactor.

According to a second aspect, this disclosure provides a short-circuit protection method for a target circuit. The method includes obtaining a comparison result between an absolute value of a first sampling voltage at two terminals of a first sampling resistor in a first detection branch and an absolute value of a second sampling voltage at two terminals of a second sampling resistor in a second detection branch. The first detection branch is connected in parallel to a first terminal and a second terminal of a target circuit, and the second detection branch is connected in parallel to the first terminal and the second terminal of the target circuit. The first detection branch includes a first sampling resistor and a first sampling capacitor that is connected in parallel to the first sampling resistor. The second detection branch includes a second sampling resistor. When the target circuit is working, a difference between the absolute value of the second sampling voltage at the two terminals of the second sampling resistor and the absolute value of the first sampling voltage at the two terminals of the first sampling resistor is a first difference. The method further includes, if the difference between the absolute value of the second sampling voltage and the absolute value of the first sampling voltage is a second difference and the second difference is less than the first difference, controlling the target circuit to stop working.

With reference to the second aspect, in a first possible implementation, the detection branch further includes a second sampling capacitor, the second sampling capacitor is connected in parallel to the second sampling resistor, and a capacitance value of the second sampling capacitor is less than that of the first sampling capacitor.

With reference to the second aspect, in a second possible implementation, the first detection branch includes two resistors that are connected in series, the two resistors that are connected in series in the first detection branch further include a third sampling resistor, one terminal of the third sampling resistor is connected to the first terminal of the target circuit and one terminal of the second sampling resistor, and the other terminal of the first sampling resistor is connected to the second terminal of the target circuit and the other terminal of the second sampling resistor.

With reference to the second aspect, in a third possible implementation, the second detection branch includes two resistors that are connected in series, the two resistors that are connected in series in the second detection branch further include a fourth sampling resistor, the first terminal of the target circuit is connected to the second terminal of the target circuit by using the fourth sampling resistor and the second sampling resistor, and a ratio of a resistance value of the fourth sampling resistor to a resistance value of the second sampling resistor is less than or equal to a ratio of a resistance value of the third sampling resistor to a resistance value of the first sampling resistor.

With reference to the second aspect, in a fourth possible implementation, the method further includes obtaining a level signal that is output by a comparator, where a first input terminal of the comparator is configured to collect the first sampling voltage at the two terminals of the first sampling resistor, a second input terminal of the comparator is configured to collect the second sampling voltage at the two terminals of the second sampling resistor, and the comparator is configured to output a first level signal when the first sampling voltage is less than the second sampling voltage, and output a second level signal when the first sampling voltage is greater than or equal to the second sampling voltage, and when the level signal that is output by the comparator is the second level signal, controlling the target circuit to stop working.

With reference to the second aspect, in a fifth possible implementation, the method further includes, after a preset duration elapses if the difference between the absolute value of the second sampling voltage and the absolute value of the first sampling voltage is the second difference, obtaining the comparison result between the absolute value of the first sampling voltage at the two terminals of the first sampling resistor and the absolute value of the second sampling voltage at the two terminals of the second sampling resistor at a first moment, and if the difference between the absolute value of the second sampling voltage and the absolute value of the first sampling voltage is a third difference, and the third difference is less than the first difference, controlling the target circuit to stop working.

With reference to the second aspect, in a sixth possible implementation, the target circuit includes a power supply and one switching device that is coupled to two terminals of the power supply or a plurality of switching devices that are connected in series. The power supply includes a direct current source or a capacitor.

With reference to the second aspect, in a seventh possible implementation, when the target circuit includes the one switching device or the plurality of switching devices that are connected in series, the switching device in the target circuit may be off, to control the target circuit to stop working.

With reference to the second aspect, in an eighth possible implementation, the switching device includes a power tube, a relay, or a contactor.

According to a third aspect, this disclosure provides a power conversion device. The power conversion device includes the short-circuit protection apparatus and the target circuit according to any one of the first aspect to the possible implementations of the first aspect.

It should be understood that implementation and beneficial effects of the foregoing aspects of this disclosure may be referred to each other.

DESCRIPTION OF EMBODIMENTS

The short-circuit protection apparatus provided in this disclosure is configured to implement short-circuit protection for a power supply (for example, a direct current power supply or a capacitor). The short-circuit protection apparatus may be disposed outside or inside a device in which a power supply requiring short-circuit protection is disposed. For example, the short-circuit protection apparatus may be disposed in a power conversion device, and connected in parallel to a target circuit in the power conversion device. The power conversion device includes a frequency converter, a ballast, a power adapter, an inverter, a direct current (DC)/DC converter, and the like. The target circuit includes a power supply and one switching device that is coupled to two terminals of the power supply or a plurality of switching devices that are connected in series. The power conversion device may be applied to a power supply scenario of an electronic device (the electronic device includes a smartphone, a tablet computer, a desktop computer, a smart speaker, and the like), a new energy power supply scenario (for example, a photovoltaic power supply scenario and a wind power supply scenario), a switch control scenario (for example, connection and bypass control of a battery, and bypass control of a static volt-ampere reactive (VAR) generator (SVG) module), and the like. The following uses an example of the power supply scenario of the electronic device and the photovoltaic power supply scenario.

Figure 1:
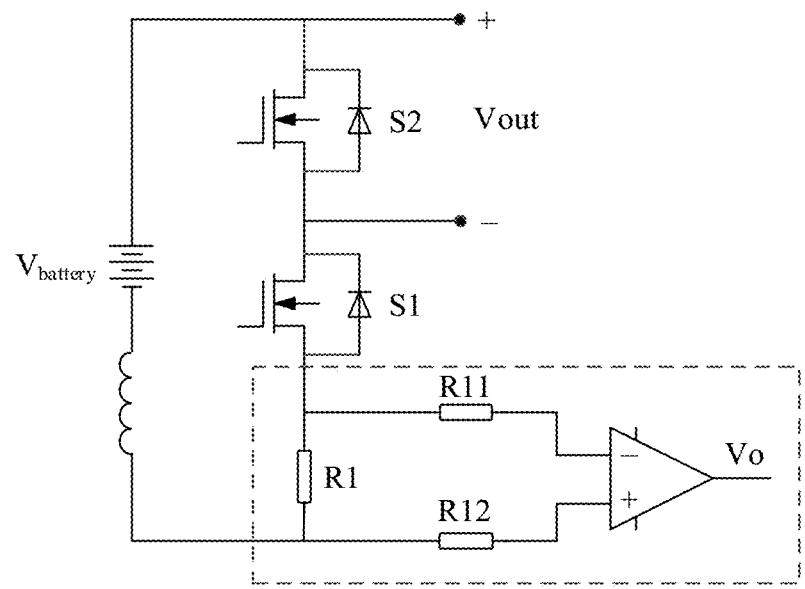
FIG. 1 is a schematic diagram of a structure of a short-circuit protection apparatus in the conventional technology.
Figure 2A:
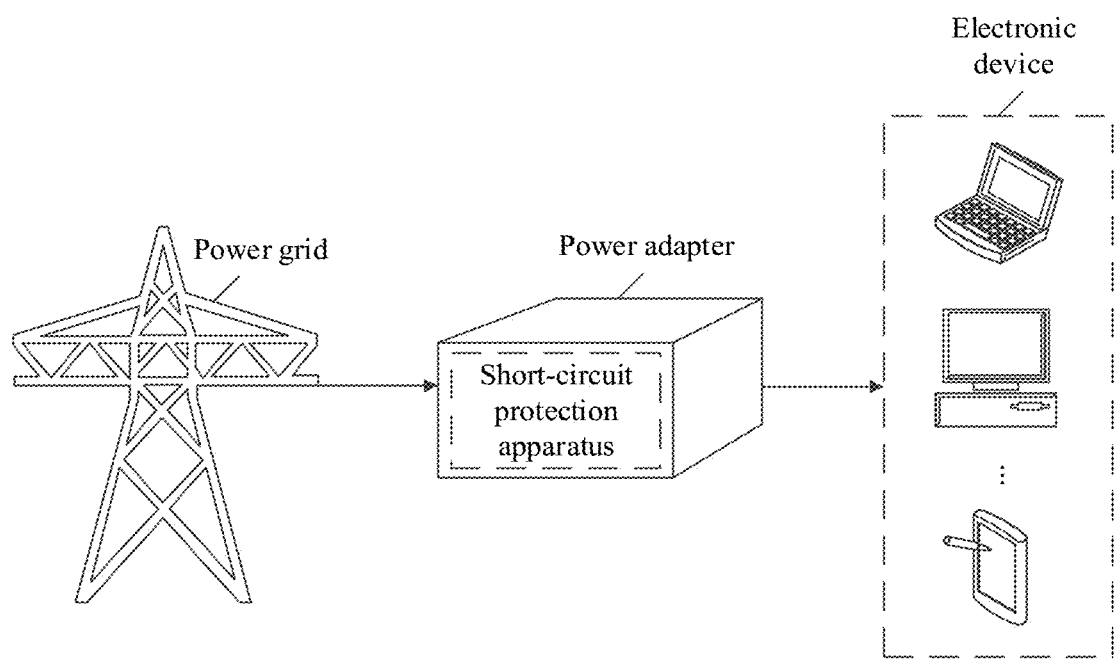
FIG. 2A is a schematic diagram of an application scenario of a power conversion device according to this disclosure.

Refer to FIG. 2A. FIG. 2A is a schematic diagram of an application scenario of a power conversion device according to this disclosure. In a power supply scenario of an electronic device, the power conversion device provided in this disclosure is applicable to a power adapter shown in FIG. 2A. An input terminal of the power adapter is connected to a power grid, and an output terminal of the power adapter is connected to the electronic device. The power adapter includes a short-circuit protection apparatus and a target circuit (not shown in the figure) that is connected in parallel to the short-circuit protection apparatus. The short-circuit protection apparatus is configured to perform short-circuit protection for the target circuit. When the target circuit in the power adapter is not short-circuited, the power adapter may first invert an alternating current voltage (for example, 220 volts (V)) provided by the power grid into a first direct current voltage, then perform direct current conversion on the first direct current voltage to obtain a second direct current voltage, and output the second direct current voltage to the electronic device, to supply power to the electronic device. When two terminals of the target circuit are short-circuited, the short-circuit protection apparatus in the power adapter can control the target circuit to stop working in a timely manner, to implement the short-circuit protection for the power adapter. This improves safety of the power adapter when the power adapter supplies the power to the electronic device, and improves applicability.

Figure 2B:
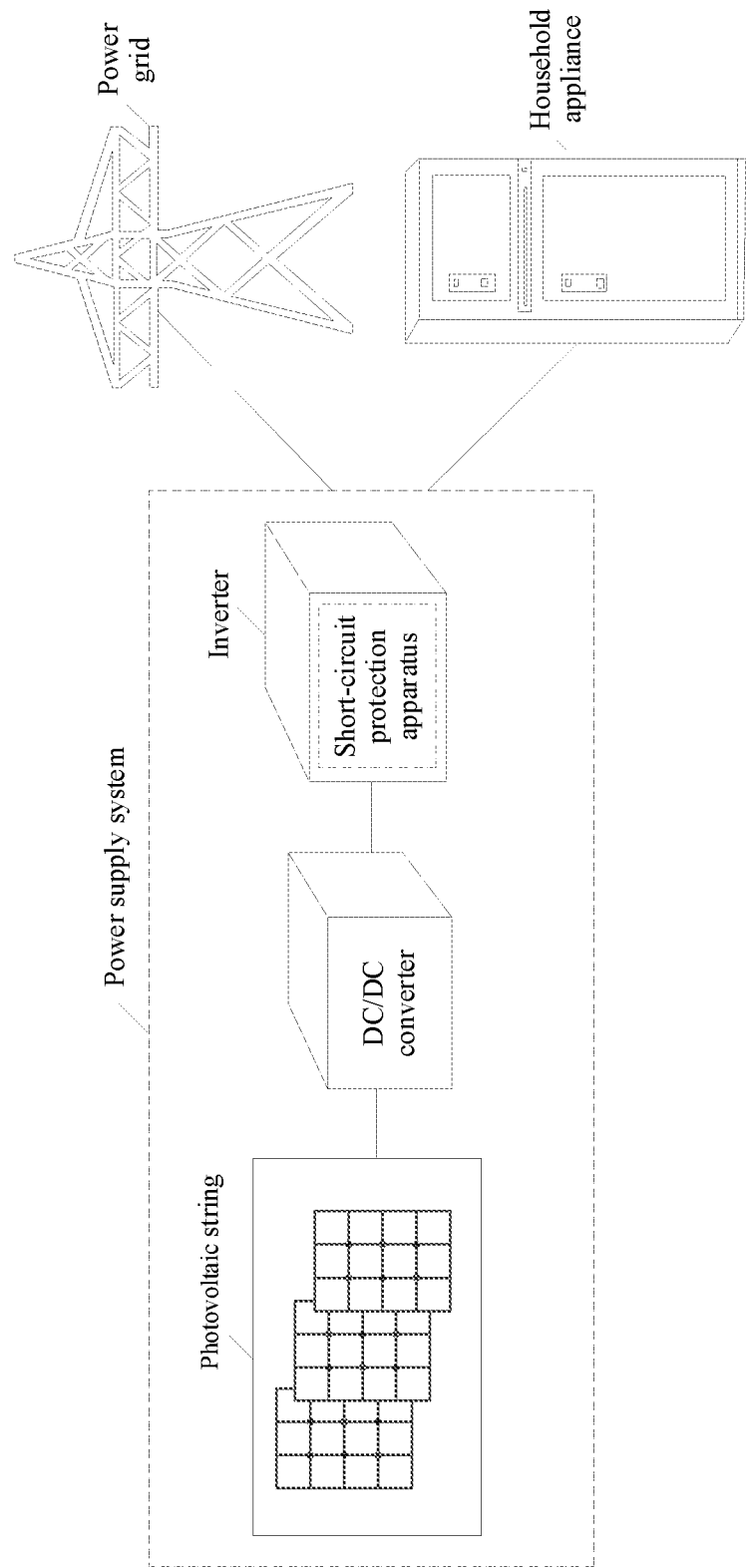
FIG. 2B is a schematic diagram of another application scenario of a power conversion device according to this disclosure.

Refer to FIG. 2B. FIG. 2B is a schematic diagram of another application scenario of a power conversion device according to this disclosure. In a photovoltaic power supply scenario, the power conversion device provided in this disclosure is applicable to a DC/DC converter or an inverter in a power supply system shown in FIG. 2B. The following uses the inverter as an example. The power supply system may include a photovoltaic string, the DC/DC converter, and the inverter. Each photovoltaic string may include a plurality of photovoltaic modules that are connected in series and/or in parallel. An input terminal of the DC/DC converter is connected to the photovoltaic string, and an output terminal of the DC/DC converter is connected to an input terminal of the inverter. The inverter includes a short-circuit protection apparatus and a target circuit (not shown in the figure) that is connected in parallel to the short-circuit protection apparatus. The short-circuit protection apparatus is configured to perform short-circuit protection for the target circuit. When the target circuit in the inverter is not short-circuited, the DC/DC converter performs direct current conversion on a direct current voltage that is generated by a photovoltaic string connected to the DC/DC converter, to convert the direct current voltage into a direct current whose voltage is a preset value, and outputs the direct current to the inverter. The inverter inverts the direct current that is output by the DC/DC converter into an alternating current, to supply power to various types of electric devices such as an alternating current power grid or an alternating current load (for example, a household appliance). When two terminals of the target circuit are short-circuited, the short-circuit protection apparatus in the inverter can control the target circuit to stop working in a timely manner, to implement the short-circuit protection for the inverter. This improves safety of the power supply system, and improves applicability.

The foregoing is merely an example of the application scenario of the short-circuit protection apparatus provided in this disclosure, and is not exhaustive. The application scenario is not limited in this disclosure.

It should be noted that the target circuit may be a circuit including any component that has a short-circuit risk. For example, the target circuit may be a power supply and one switching device that is coupled to two terminals of the power supply or a plurality of switching devices that are connected in series. The switching device includes but is not limited to a power tube (for example, a MOSFET, an IGBT, or a triode), a relay, and a contactor. The power supply includes but is not limited to a direct current power supply (such as a battery) or a capacitor. For example, when the power supply is a flying capacitor, the target circuit may be a circuit that is formed by parallelly connecting a branch circuit to the flying capacitor, where a plurality of serially-connected power tubes in a direct current conversion circuit of a multi-level direct current converter are disposed in the branch circuit.

With reference to FIG. 3 to FIG. 10, the following describes a working principle of the short-circuit protection apparatus provided in this disclosure by using an example in which a target circuit is a circuit that is formed by two MOSFETs connected in series and a direct current power supply connected in parallel to the two MOSFETs.

Figure 3:
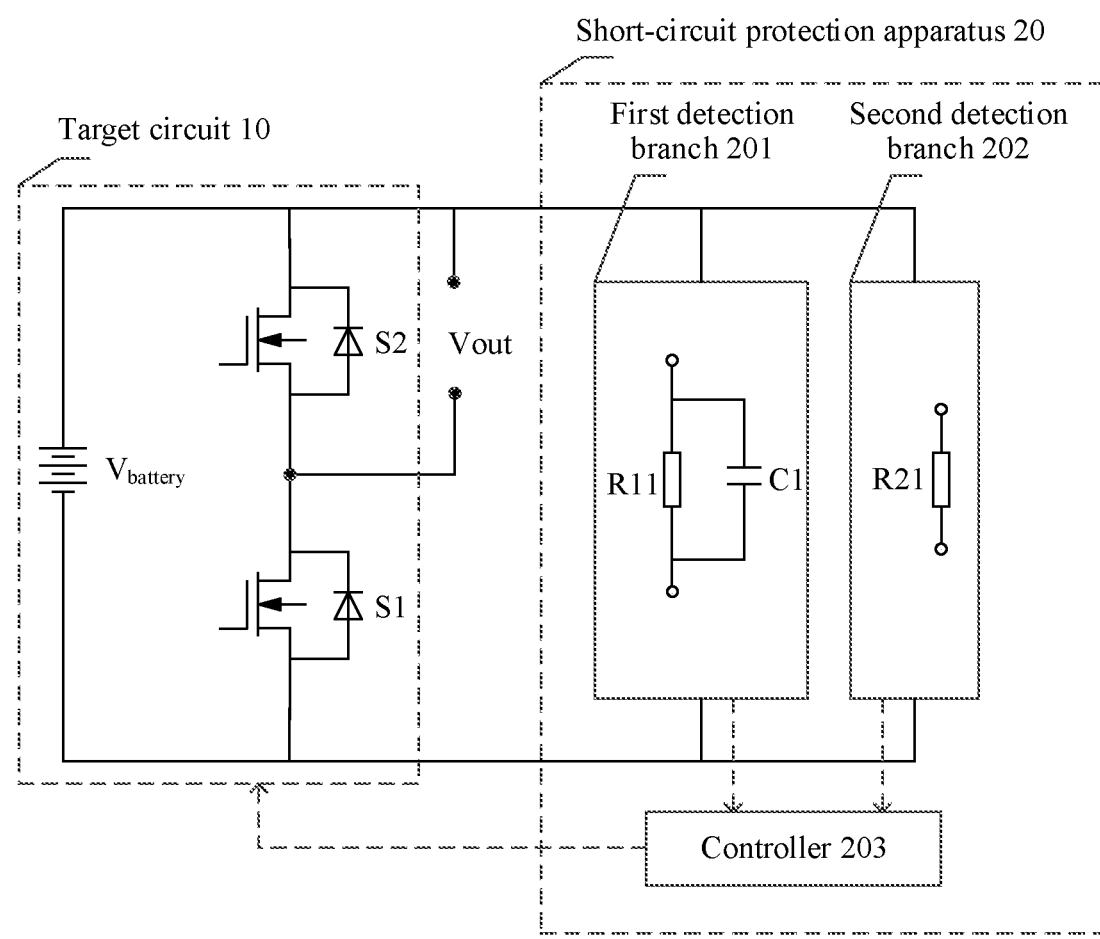
FIG. 3 is a schematic diagram of a structure of a short-circuit protection apparatus according to this disclosure.

Refer to FIG. 3. FIG. 3 is a schematic diagram of a structure of a short-circuit protection apparatus according to this disclosure. As shown in FIG. 3, a target circuit 10 is a circuit that is formed by parallelly connecting a branch circuit including serially-connected MOSFETs S1 and S2 to a direct current power supply $V_{battery}$. A short-circuit protection apparatus 20 includes a first detection branch 201, a second detection branch 202, and a controller 203. The first detection branch 201 is connected in parallel to a first terminal (that is, a drain of S2) and a second terminal (that is, a source of S1) of the target circuit 10. The first detection branch 201 includes a first sampling resistor R11 and a first sampling capacitor C1 that is connected in parallel to R11. The second detection branch 202 is connected in parallel to the first terminal and the second terminal of the target circuit 10. The second detection branch 202 includes a second sampling resistor R21. In addition, when the target circuit 10 is working (in other words, S1 and S2 are not short-circuited), a difference between an absolute value of a second sampling voltage at two terminals of R21 and an absolute value of a first sampling voltage at two terminals of R11 is a first difference.

In an optional implementation, the controller 203 obtains a comparison result between the absolute value of the first sampling voltage at the two terminals of R11 and the absolute value of the second sampling voltage at the two terminals of R21. If the difference between the absolute value of the second sampling voltage and the absolute value of the first sampling voltage is a second difference, the controller determines that S1 and S2 are short-circuited, and controls S1 and S2 to be off, where the first difference is greater than the second difference.

It may be understood that, when S1 and S2 are short-circuited, a voltage at two terminals of the first detection branch 201 and a voltage at two terminals of the second detection branch 202 are 0, and the absolute value of the second sampling voltage is quickly decreased to 0 as the voltage at the two terminals of the second detection branch 202 is decreased. However, the absolute value of the first sampling voltage basically remains unchanged because of C1. In other words, whether the target circuit 10 is short-circuited may be determined based on whether the difference between the absolute value of the second sampling voltage and the absolute value of the first sampling voltage is changed. When S1 and S2 are short-circuited, a decrease in the absolute value of voltage (that is, a voltage at two terminals of the power supply $V_{battery}$) at two terminals of the target circuit 10 is faster than an increase in short-circuit current. Therefore, a short-circuit fault can be quickly rectified in a timely manner, so that the target circuit 10 may be effectively protected. In addition, because the short-circuit protection apparatus 20 is connected in parallel to the target circuit 10, even if there is an inductance affecting the increase in the short-circuit current between any of the two terminals of the power supply $V_{battery}$ and the drain of S2 or the source of S1, fast short-circuit protection performed by the short-circuit protection apparatus 20 on the target circuit 10 is not affected by the inductance. Therefore, applicability is high.

Figure 4:
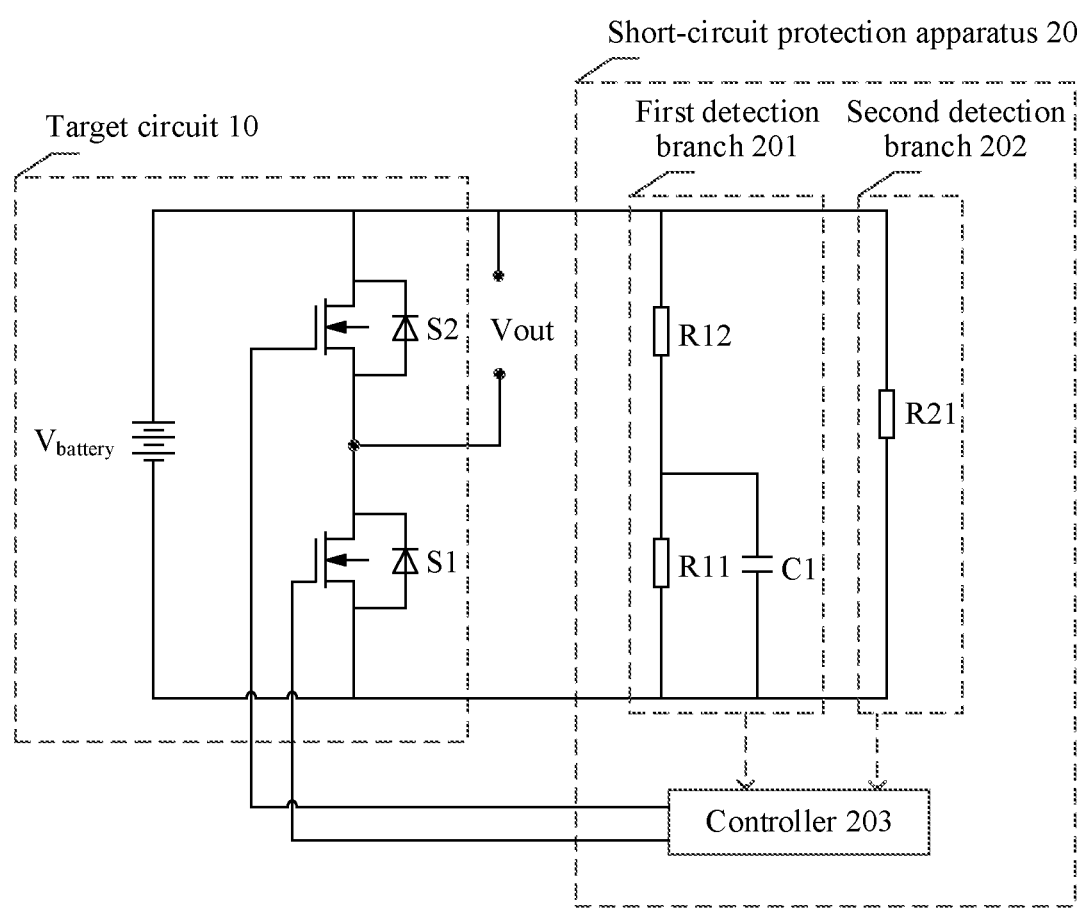
FIG. 4 is a schematic diagram of another structure of a short-circuit protection apparatus according to this disclosure.

For example, refer to FIG. 4. FIG. 4 is a schematic diagram of a structure of a short-circuit protection apparatus according to this disclosure. As shown in FIG. 4, the first detection branch 201 includes the first sampling resistor R11, the first sampling capacitor C1, and a third sampling resistor R12. R11 and C1 are connected in parallel. R11 and R12 are connected in series. The first terminal of the target circuit 10 is connected to the second terminal of the target circuit 10 by using R12 and R11 in sequence. The second detection branch 202 includes the second sampling resistor R21. R21 is connected in parallel to the two terminals of the target circuit 10. The controller 203 is connected to a gate of S1 and a gate of S2, and is configured to output a pulse width modulation (PWM) wave to S1 and S2, to control working states of S1 and S2.

Figure 5:
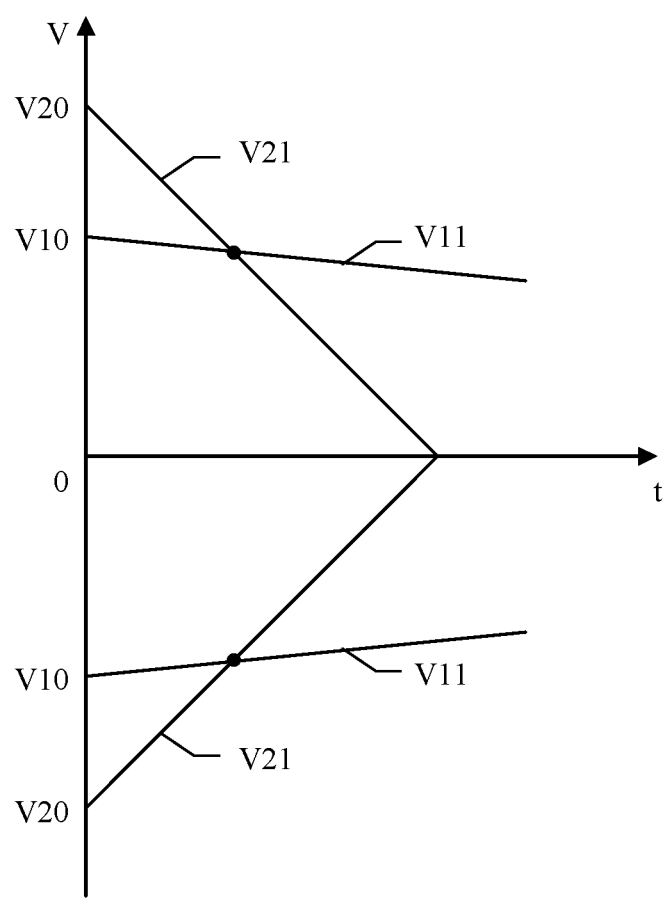
FIG. 5 is a schematic diagram of a change process of a first sampling voltage and a second sampling voltage when two terminals of a target circuit are short-circuited according to this disclosure.

It can be learned from a circuit structure shown in FIG. 4 that, when the target circuit 10 is working, in other words, S1 and S2 are not short-circuited, the first sampling voltage at the two terminals of R11 is less than the second sampling voltage at the two terminals of R21, and the first sampling voltage and the second sampling voltage are greater than 0, that is, the first difference between the second sampling voltage and the first sampling voltage is greater than 0. When S1 and S2 are short-circuited, the voltage at the two terminals of the target circuit 10 is quickly decreased, the second sampling voltage is decreased to 0 as the voltage at the two terminals of the target circuit 10 is quickly decreased, and the first sampling voltage basically remains unchanged because of C1. For ease of understanding, refer to FIG. 5. FIG. 5 is a schematic diagram of a change process of a first sampling voltage and a second sampling voltage when two terminals of a target circuit are short-circuited according to this disclosure. As shown in FIG. 5, when S1 and S2 are not short-circuited, the first sampling voltage at the two terminals of R11 is V10, and the second sampling voltage at the two terminals of R21 is V20. When V20 is greater than V10 and greater than 0, and S1 and S2 are short-circuited, a decrease in the first sampling voltage V11 is less than that in a second sampling voltage V21. When V21 is decreased to less than or equal to V11, the short-circuit protection is triggered. When V20 is less than V10 and less than 0, and S1 and S2 are short-circuited, an increase in the first sampling voltage V11 is less than that in the second sampling voltage V21. When V21 is increased to greater than or equal to V11, the short-circuit protection is triggered.

In an optional embodiment, the controller 203 obtains the first sampling voltage at the two terminals of R11 and the second sampling voltage at the two terminals of R21. When the first sampling voltage is greater than or equal to the second sampling voltage, in other words, the second difference between the second sampling voltage and the first sampling voltage is less than or equal to 0, the first difference is greater than the second difference, and S1 and S2 are short-circuited, the controller separately outputs a PWM wave of a preset duty cycle to the gate of S1 and the gate of S2, so that S1 and S2 are off.

It may be understood that, because a decrease in the voltage at the two terminals of the target circuit 10 is faster than the increase in the short-circuit current, the target circuit 10 that is short-circuited may be quickly rectified in a timely manner, to perform the short-circuit protection on the target circuit 10. In addition, because the target circuit 10 is connected in parallel to the short-circuit protection apparatus 20, fast short-circuit protection performed by the short-circuit protection apparatus 20 is not affected by the inductance. In addition, the short-circuit protection apparatus 20 in this embodiment can detect, by using only three resistors and one capacitor, whether the two terminals of the target circuit 10 are short-circuited. Therefore, a circuit structure is simple, circuit costs can be reduced, and the applicability is high.

In another optional embodiment, the controller 203 obtains the first sampling voltage at the two terminals of R11 and the second sampling voltage at the two terminals of R21. After a first duration elapses if the first sampling voltage is greater than or equal to the second sampling voltage (in other words, the second difference between the second sampling voltage and the first sampling voltage is less than the first difference), the controller obtains, the first sampling voltage at the two terminals of R11 and the second sampling voltage at the two terminals of R21 at a first moment. If the first sampling voltage is still greater than or equal to the second sampling voltage at the first moment, in other words, a third difference between the second sampling voltage and the first sampling voltage is less than or equal to 0 at the first moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

In still another optional embodiment, the controller 203 obtains the first sampling voltage at the two terminals of R11 and the second sampling voltage at the two terminals of R21. When the first sampling voltage is greater than or equal to the second sampling voltage (in other words, the second difference between the second sampling voltage and the first sampling voltage is less than the first difference), the controller filters the first sampling voltage and the second sampling voltage through software filtering, and obtains, at a second moment after the first sampling voltage and the second sampling voltage are filtered, the first sampling voltage at the two terminals of R11 and the second sampling voltage at the two terminals of R21. If the first sampling voltage is still greater than or equal to the second sampling voltage at the second moment, in other words, a fourth difference between the second sampling voltage and the first sampling voltage is less than or equal to 0 at the second moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

It may be understood that, the short-circuit protection may not be mistakenly triggered by delaying or filtering in the last two embodiments corresponding to FIG. 4 in comparison with the first embodiment corresponding to FIG. 4, and this improves accuracy of performing the short-circuit protection by the short-circuit protection apparatus 20, and improves stability of a working device in which the target circuit 10 and the short-circuit protection apparatus 20 are disposed.

It should be noted that, when the first sampling voltage and the second sampling voltage are less than 0, the short-circuit protection apparatus can still perform the short-circuit protection on the target circuit 10.

When the target circuit 10 is working, and the second sampling voltage is less than the first sampling voltage and less than 0, in other words, the first difference between the absolute value of the second sampling voltage and the absolute value of the first sampling voltage is greater than 0, the controller 203 obtains the first sampling voltage and the second sampling voltage. When the absolute value of the first sampling voltage is greater than or equal to the absolute value of the second sampling voltage, in other words, the second difference between the absolute value of the second sampling voltage and the absolute value of the first sampling voltage is less than the first difference, and the target circuit 10 is short-circuited, the controller separately outputs the PWM wave of the preset duty cycle to the gate of S1 and the gate of S2, so that S1 and S2 are off, and the target circuit 10 stops working.

Further, to prevent the short-circuit protection from being mistakenly triggered, the accuracy of performing the short-circuit protection by the short-circuit protection apparatus 20 may be further improved by delaying or filtering.

Further, the controller 203 obtains the first sampling voltage at the two terminals of R11 and the second sampling voltage at the two terminals of R21. When the absolute value of the first sampling voltage is greater than or equal to the absolute value of the second sampling voltage (in other words, the second difference is less than the first difference), the controller obtains, at the first moment of passing a preset duration, the first sampling voltage at the two terminals of R11 and the second sampling voltage at the two terminals of R21. If the absolute value of the first sampling voltage is still greater than or equal to the absolute value of the second sampling voltage at the first moment, in other words, the third difference between the absolute value of the second sampling voltage and the absolute value of the first sampling voltage is less than or equal to 0 at the first moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

The controller 203 obtains the first sampling voltage at the two terminals of R11 and the second sampling voltage at the two terminals of R21. When the absolute value of the first sampling voltage is greater than or equal to the absolute value of the second sampling voltage (in other words, the second difference is less than the first difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the absolute value of the first sampling voltage is still greater than or equal to the absolute value of the second sampling voltage at the second moment, in other words, the fourth difference between the absolute value of the second sampling voltage and the absolute value of the first sampling voltage is less than or equal to 0 at the second moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

When the target circuit 10 is working, the first sampling voltage is equal to the second sampling voltage, and the first sampling voltage and the second sampling voltage are less than 0, in other words, the first difference between the absolute value of the second sampling voltage and the absolute value of the first sampling voltage is equal to 0, the controller 203 obtains the first sampling voltage and the second sampling voltage. When the absolute value of the first sampling voltage is greater than the absolute value of the second sampling voltage, in other words, the second difference between the absolute value of the second sampling voltage and the absolute value of the first sampling voltage is less than the first difference, and the target circuit 10 is short-circuited, the controller separately outputs the PWM wave of the preset duty cycle to the gate of S1 and the gate of S2, so that S1 and S2 are off, and the target circuit 10 stops working.

Further, to prevent the short-circuit protection from being mistakenly triggered, the accuracy of performing the short-circuit protection by the short-circuit protection apparatus 20 may be further improved by delaying or filtering.

Further, the controller 203 obtains the first sampling voltage at the two terminals of R11 and the second sampling voltage at the two terminals of R21. When the absolute value of the first sampling voltage is greater than the absolute value of the second sampling voltage (in other words, the second difference between the absolute value of the second sampling voltage and the absolute value of the first sampling voltage is less than the first difference), the controller obtains, at the first moment of passing a preset duration, the first sampling voltage at the two terminals of R11 and the second sampling voltage at the two terminals of R21. If the absolute value of the first sampling voltage is still greater than the absolute value of the second sampling voltage at the first moment, in other words, the third difference between the absolute value of the second sampling voltage and the absolute value of the first sampling voltage is less than 0 at the first moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

The controller 203 obtains the first sampling voltage at the two terminals of R11 and the second sampling voltage at the two terminals of R21. When the absolute value of the first sampling voltage is greater than the absolute value of the second sampling voltage (in other words, the second difference between the absolute value of the second sampling voltage and the absolute value of the first sampling voltage is less than the first difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the absolute value of the first sampling voltage is still greater than the absolute value of the second sampling voltage at the second moment, in other words, the fourth difference between the absolute value of the second sampling voltage and the absolute value of the first sampling voltage is less than 0 at the second moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

Figure 6:
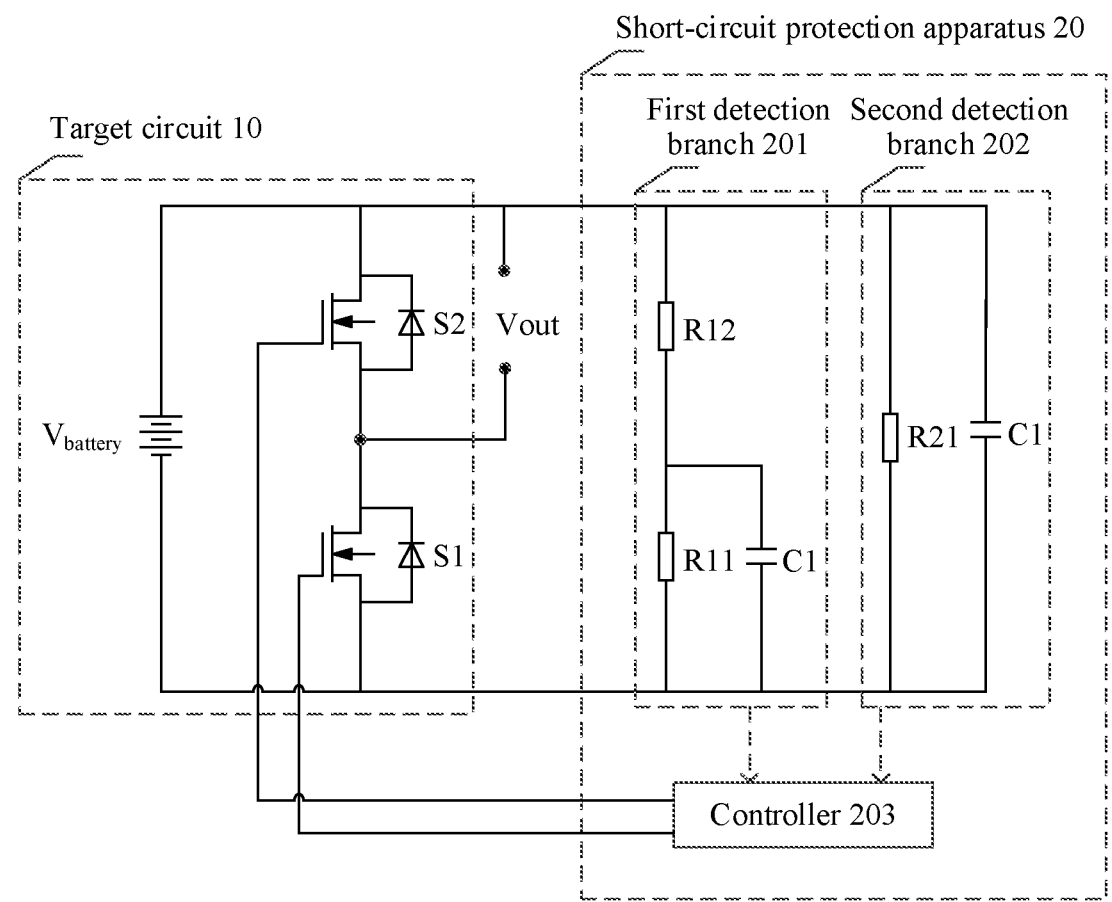
FIG. 6 is a schematic diagram of another structure of a short-circuit protection apparatus according to this disclosure.

Further, the second detection branch 202 shown in FIG. 4 may further include a second sampling capacitor that is connected in parallel to the second sampling resistor R21. For details, refer to a schematic diagram of another structure of a short-circuit protection apparatus shown in FIG. 6. As shown in FIG. 6, the second detection branch 202 further includes a second sampling capacitor C2 connected in parallel to R21. A capacitance value of C2 is less than that of C1, to ensure that when S1 and S2 are short-circuited, the decrease in the first sampling voltage is less than the decrease in the second sampling voltage. Therefore, when S1 and S2 are short-circuited, a difference between the first sampling voltage and the second sampling voltage may be reversed to trigger the short-circuit protection. In addition, C2 may filter a spike voltage in the second sampling voltage at the two terminals of R21, to prevent the short-circuit protection from being mistakenly triggered due to a decreased spike voltage. This improves the accuracy of performing the short-circuit protection by the short-circuit protection apparatus 20, and improves the stability of the working device (for example, the power conversion device) in which the target circuit 10 and the short-circuit protection apparatus 20 are disposed. For description of the embodiment in which the controller 203 performs the short-circuit protection on the target circuit 10 based on the first sampling voltage and the second sampling voltage, refer to corresponding descriptions in the embodiment corresponding to FIG. 4. Details are not described herein again.

Figure 7:
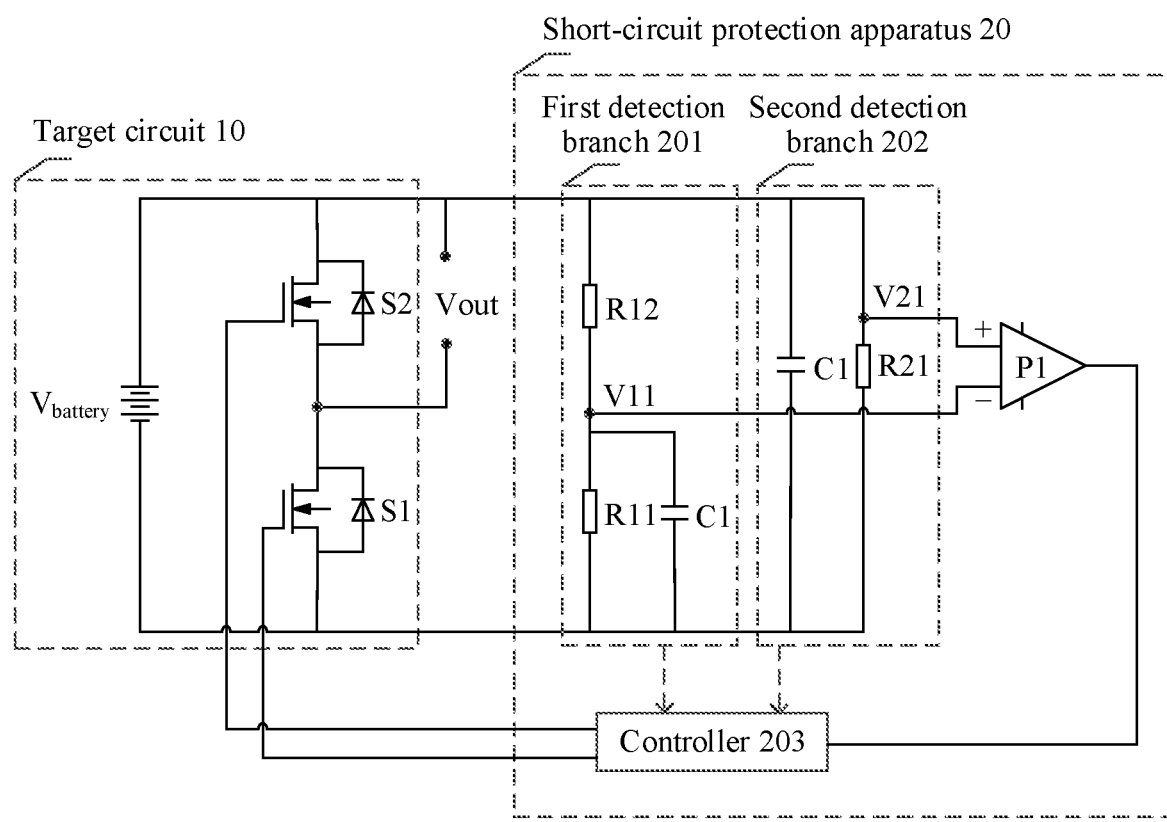
FIG. 7 is a schematic diagram of another structure of a short-circuit protection apparatus according to this disclosure.

Further, the short-circuit protection apparatus 20 shown in FIG. 6 further includes a comparator. For details, refer to a schematic diagram of another structure of a short-circuit protection apparatus shown in FIG. 7. As shown in FIG. 7, the short-circuit protection apparatus 20 further includes a comparator P1. A positive-phase input terminal of P1 is configured to collect the second sampling voltage V21 at the two terminals of R21, an inverse-phase input terminal is configured to collect the first sampling voltage V11 at the two terminals of R11, and an output terminal is connected to the controller 203 and configured to, when V11 is smaller than V21, output a high-level signal, and when V11 is greater than or equal to V21, output a low-level signal. It can be learned from a circuit structure shown in FIG. 7 that, when the target circuit 10 is working, V21 is greater than V11 and greater than 0 (in other words, the first difference is greater than 0). Therefore, the comparator P1 outputs the high-level signal when the target circuit 10 is working. Optionally, a positive-phase input terminal of the comparator P1 may also be configured to collect the first sampling voltage V11 at the two terminals of R11, and a negative-phase input terminal is configured to collect the second sampling voltage V21 at the two terminals of R21. This is not limited in this disclosure.

In an optional embodiment, the controller 203 obtains a level signal that is output by the comparator P1. When the level signal is the low-level signal, to be specific, V21 is less than or equal to V11, that is, the second difference is less than the first difference, and S1 and S2 are short-circuited, the controller separately outputs the PWM wave of the preset duty cycle to the gate of S1 and the gate of S2, so that S1 and S2 are off.

It may be understood that, because the decrease in the voltage at the two terminals of the target circuit 10 is faster than the increase in the short-circuit current, the target circuit 10 that is short-circuited may be quickly rectified in a timely manner, to perform the short-circuit protection on the target circuit 10. In addition, because the target circuit 10 is connected in parallel to the short-circuit protection apparatus 20, fast short-circuit protection performed by the short-circuit protection apparatus 20 is not affected by the inductance.

In another optional embodiment, the controller 203 obtains, at the first moment of passing a preset duration after the comparator P1 outputs the low-level signal, the level signal that is output by the comparator P1. If the level signal is still the low-level signal at the first moment, in other words, V21 is less than or equal to V11 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

In still another optional embodiment, the controller 203 obtains the level signal that is output by the comparator P1. When the level signal is the low-level signal, the controller filters the first sampling voltage and the second sampling voltage through software filtering, and obtains, at the second moment after the first sampling voltage and the second sampling voltage are filtered, the level signal that is output by the comparator P1. If the level signal is still the low-level signal at the second moment, in other words, the second sampling voltage is less than or equal to the first sampling voltage at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

It may be understood that, the short-circuit protection may not be mistakenly triggered by delaying or filtering in the last two embodiments corresponding to FIG. 6 in comparison with the first embodiment corresponding to FIG. 6, and this improves the accuracy of performing the short-circuit protection by the short-circuit protection apparatus 20, and improves the stability of the working device (for example, the power conversion device) in which the target circuit 10 and the short-circuit protection apparatus 20 are disposed.

It should be noted that, when the first sampling voltage and the second sampling voltage are less than 0, the short-circuit protection apparatus can still perform the short-circuit protection on the target circuit 10.

When the target circuit 10 is working, and the second sampling voltage is less than the first sampling voltage and less than 0, in other words, and the first difference between the absolute value of the second sampling voltage and the absolute value of the first sampling voltage is greater than 0, the comparator P1 outputs the low-level signal. The controller 203 obtains the level signal that is output by the comparator P1. When the level signal is the high-level signal, to be specific, the first sampling voltage is less than the second sampling voltage and less than 0, in other words, the second difference is less than the first difference, and S1 and S2 are short-circuited, the controller separately outputs the PWM wave of the preset duty cycle to the gate of S1 and the gate of S2, so that S1 and S2 are off.

Further, to prevent the short-circuit protection from being mistakenly triggered, the accuracy of performing the short-circuit protection by the short-circuit protection apparatus 20 may be further improved by delaying or filtering.

Further, the controller 203 obtains, at the first moment of passing a preset duration after the comparator P1 outputs the high-level signal, the level signal that is output by the comparator P1. If the level signal is still the high-level signal at the first moment, in other words, the first sampling voltage is still less than the second sampling voltage and less than 0 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

The controller 203 obtains the level signal that is output by the comparator P1. When the level signal is the high-level signal, the controller filters the first sampling voltage and the second sampling voltage through software filtering, and obtains, at the second moment after the first sampling voltage and the second sampling voltage are filtered, the level signal that is output by the comparator P1. If the level signal is still the high-level signal at the second moment, in other words, the first sampling voltage is still less than the second sampling voltage and less than 0 at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

When the target circuit 10 is working, the second sampling voltage is equal to the first sampling voltage, and the first sampling voltage and the second sampling voltage are less than 0, in other words, the first difference between the absolute value of the second sampling voltage and the absolute value of the first sampling voltage is equal to 0, the comparator P1 outputs the low-level signal. The controller 203 obtains the level signal that is output by the comparator P1. When the level signal is the high-level signal, to be specific, the first sampling voltage is less than the second sampling voltage and less than 0, in other words, the second difference is less than the first difference, and S1 and S2 are short-circuited, the controller separately outputs the PWM wave of the preset duty cycle to the gate of S1 and the gate of S2, so that S1 and S2 are off. Further, to prevent the short-circuit protection from being mistakenly triggered, the accuracy of performing the short-circuit protection by the short-circuit protection apparatus 20 may be further improved by delaying or filtering.

Further, the controller 203 obtains, at the first moment of passing a preset duration after the comparator P1 outputs the high-level signal, the level signal that is output by the comparator P1. If the level signal is still the high-level signal at the first moment, in other words, the first sampling voltage is still less than the second sampling voltage and less than 0 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

The controller 203 obtains the level signal that is output by the comparator P1. When the level signal is the high-level signal, the controller filters the first sampling voltage and the second sampling voltage through software filtering, and obtains, at the second moment after the first sampling voltage and the second sampling voltage are filtered, the level signal that is output by the comparator P1. If the level signal is still the high-level signal at the second moment, in other words, the first sampling voltage is still less than the second sampling voltage and less than 0 at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

Figure 8:
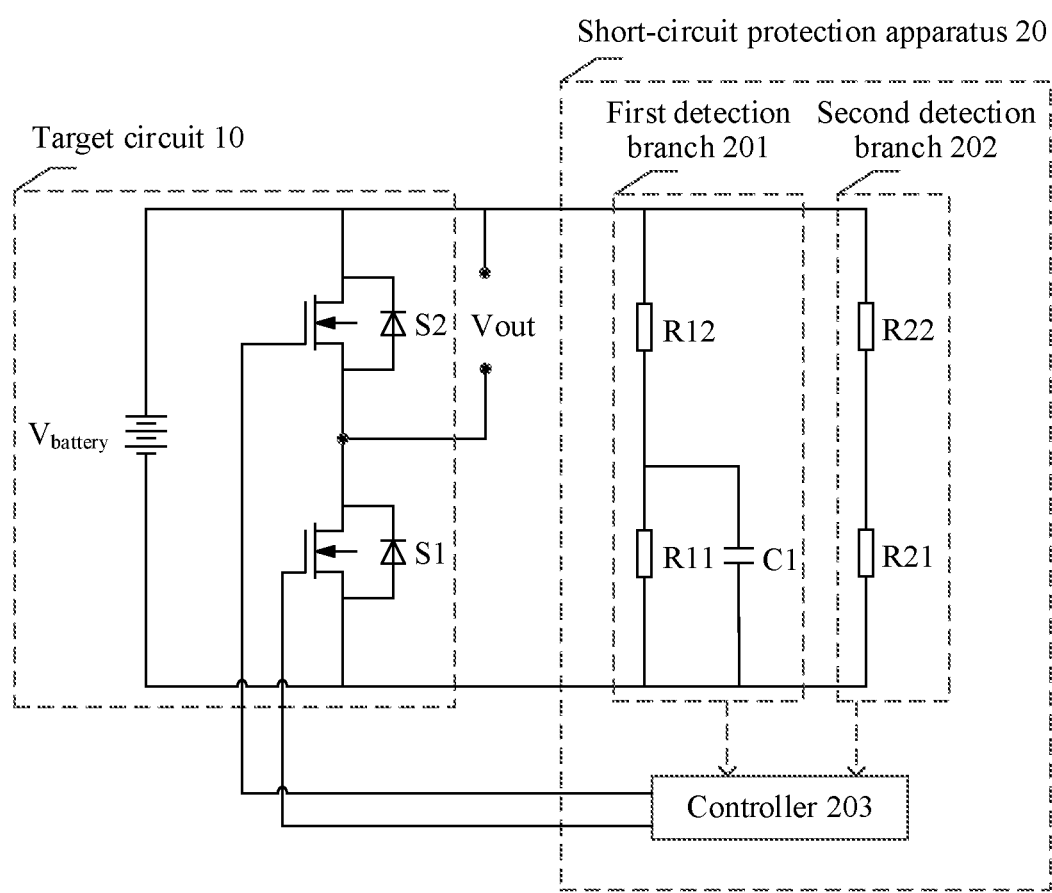
FIG. 8 is a schematic diagram of another structure of a short-circuit protection apparatus according to this disclosure.

For example, refer to FIG. 8. FIG. 8 is a schematic diagram of a structure of a short-circuit protection apparatus according to this disclosure. As shown in FIG. 4, the first detection branch 201 includes the first sampling resistor R11, the first sampling capacitor C1, and the third sampling resistor R12. R11 and C1 are connected in parallel. R11 and R12 are connected in series. The first terminal of the target circuit 10 is connected to the second terminal of the target circuit 10 by using R12 and R11 in sequence. The second detection branch 202 includes the second sampling resistor R21 and a fourth sampling resistor R22 that are connected in series. The first terminal of the target circuit 10 is connected to the second terminal of the target circuit 10 by using R22 and R21 in sequence. A ratio of a resistance value of R22 to a resistance value of R21 is less than or equal to that of a resistance value of R12 to a resistance value of R11. The controller 203 is connected to the gate of S1 and the gate of S2, and configured to output a PWM wave with an adjustable duty cycle to S1 and S2, to control working statuses of S1 and S2.

Because the ratio of the resistance value of R22 to the resistance value of R21 is less than or equal to that of the resistance value of R12 to the resistance value of R11, the first sampling voltage at the two terminals of R11 is less than or equal to the second sampling voltage at the two terminals of R21. Further, it can be learned from a circuit structure shown in FIG. 8 that, when the target circuit 10 is working, in other words, S1 and S2 are not short-circuited, the first sampling voltage at the two terminals of R11 is less than or equal to the second sampling voltage at the two terminals of R21, and the first sampling voltage and the second sampling voltage are greater than 0, in other words, the first difference between the second sampling voltage and the first sampling voltage is greater than or equal to 0. When S1 and S2 are short-circuited, the voltage at the two terminals of the target circuit 10 is quickly decreased, the second sampling voltage is decreased to 0 as the voltage at the two terminals of the target circuit 10 is quickly decreased, and the first sampling voltage basically remains unchanged because of C1.

In an optional embodiment, when the target circuit 10 is working, and the first sampling voltage is equal to the second sampling voltage, in other words, the first difference is equal to 0, the controller 203 obtains the first sampling voltage at the two terminals of R11 and the second sampling voltage at the two terminals of R21. When the first sampling voltage is greater than the second sampling voltage, in other words, the second difference between the second sampling voltage and the first sampling voltage is less than 0, in other words, the first difference is greater than the second difference, and S1 and S2 are short-circuited, that is, the target circuit 10 is short-circuited, the controller separately outputs the PWM wave of the preset duty cycle to the gate of S1 and the gate of S2, so that S1 and S2 are off.

In another optional embodiment, when the target circuit 10 is working, and the second sampling voltage is greater than the first sampling voltage, in other words, the first difference is greater than 0, the controller 203 obtains the first sampling voltage at the two terminals of R11 and the second sampling voltage at the two terminals of R21. When the first sampling voltage is greater than or equal to the second sampling voltage, in other words, the second difference between the second sampling voltage and the first sampling voltage is less than or equal to 0, in other words, the first difference is greater than the second difference, and S1 and S2 are short-circuited, that is, the target circuit 10 is short-circuited, the controller separately outputs the PWM wave of the preset duty cycle to the gate of S1 and the gate of S2, so that S1 and S2 are off.

It may be understood that, because the decrease in the voltage at the two terminals of the target circuit 10 is faster than the increase in the short-circuit current, the target circuit 10 that is short-circuited may be quickly rectified in a timely manner, to perform the short-circuit protection on the target circuit 10. In addition, because the target circuit 10 is connected in parallel to the short-circuit protection apparatus 20, fast short-circuit protection performed by the short-circuit protection apparatus 20 is not affected by the inductance. In addition, after R22 is added to the second detection branch 202 of the short-circuit protection apparatus 20 in this embodiment, the value between the first sampling voltage and the second sampling voltage may be changed based on an actual requirement by changing resistance values of R11, R12, R21, and R22. This can improve flexibility.

In another optional embodiment, when the target circuit 10 is working, and the first difference is equal to 0, the controller 203 obtains the first sampling voltage at the two terminals of R11 and the second sampling voltage at the two terminals of R21. When the first sampling voltage is greater than the second sampling voltage (in other words, the first difference is greater than the second difference), the controller obtains, at the first moment of passing a preset duration, the first sampling voltage at the two terminals of R11 and the second sampling voltage at the two terminals of R21. If the first sampling voltage is still greater than the second sampling voltage at the first moment (in other words, the third difference between the second sampling voltage and the first sampling voltage is less than the first difference at the first moment), and S1 and S2 are short-circuited, that is, the target circuit 10 is short-circuited, the controller separately outputs the PWM wave of the preset duty cycle to the gate of S1 and the gate of S2, so that S1 and S2 are off.

In another optional embodiment, when the target circuit 10 is working, and the first difference is greater than 0, the controller 203 obtains the first sampling voltage at the two terminals of R11 and the second sampling voltage at the two terminals of R21. When the first sampling voltage is greater than or equal to the second sampling voltage (in other words, the first difference is greater than or equal to the second difference), the controller obtains, at the first moment of passing a preset duration, the first sampling voltage at the two terminals of R11 and the second sampling voltage at the two terminals of R21. If the first sampling voltage is still greater than or equal to the second sampling voltage at the first moment (in other words, the third difference between the second sampling voltage and the first sampling voltage is less than the first difference at the first moment), and S1 and S2 are short-circuited, that is, the target circuit 10 is short-circuited, the controller separately outputs the PWM wave of the preset duty cycle to the gate of S1 and the gate of S2, so that S1 and S2 are off.

In another optional embodiment, when the target circuit 10 is working, and the first difference is equal to 0, the controller 203 obtains the first sampling voltage at the two terminals of R11 and the second sampling voltage at the two terminals of R21. When the first sampling voltage is greater than the second sampling voltage (in other words, the first difference is greater than the second difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the first sampling voltage is still greater than the second sampling voltage at the second moment (in other words, the fourth difference between the second sampling voltage and the first sampling voltage is less than the first difference at the second moment), and S1 and S2 are short-circuited, that is, the target circuit 10 is short-circuited, the controller separately outputs the PWM wave of the preset duty cycle to the gate of S1 and the gate of S2, so that S1 and S2 are off.

In still another optional embodiment, when the target circuit 10 is working, and the first difference is greater than 0, the controller 203 obtains the first sampling voltage at the two terminals of R11 and the second sampling voltage at the two terminals of R21. When the first sampling voltage is greater than or equal to the second sampling voltage (in other words, the first difference is greater than or equal to the second difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the first sampling voltage is still greater than or equal to the second sampling voltage at the second moment (in other words, the fourth difference between the second sampling voltage and the first sampling voltage is less than the first difference at the second moment), and S1 and S2 are short-circuited, that is, the target circuit 10 is short-circuited, the controller separately outputs the PWM wave of the preset duty cycle to the gate of S1 and the gate of S2, so that S1 and S2 are off.

It may be understood that, the short-circuit protection may not be mistakenly triggered by delaying or filtering in the last two embodiments corresponding to FIG. 8 in comparison with the first embodiment corresponding to FIG. 8, and this improves the accuracy of performing the short-circuit protection by the short-circuit protection apparatus 20, and improves the stability of the working device in which the target circuit 10 and the short-circuit protection apparatus 20 are disposed.

It should be noted that, when the first sampling voltage and the second sampling voltage are less than 0, the short-circuit protection apparatus can still perform the short-circuit protection on the target circuit 10.

When the target circuit 10 is working, and the second sampling voltage is less than the first sampling voltage and less than 0, in other words, the first difference between the absolute value of the second sampling voltage and the absolute value of the first sampling voltage is greater than 0, the controller 203 obtains the first sampling voltage and the second sampling voltage. When the absolute value of the first sampling voltage is greater than or equal to the absolute value of the second sampling voltage, in other words, the second difference between the absolute value of the second sampling voltage and the absolute value of the first sampling voltage is less than the first difference, and the target circuit 10 is short-circuited, the controller separately outputs the PWM wave of the preset duty cycle to the gate of S1 and the gate of S2, so that S1 and S2 are off, and the target circuit 10 stops working.

Further, to prevent the short-circuit protection from being mistakenly triggered, the accuracy of performing the short-circuit protection by the short-circuit protection apparatus 20 may be further improved by delaying or filtering.

Further, the controller 203 obtains the first sampling voltage at the two terminals of R11 and the second sampling voltage at the two terminals of R21. When the absolute value of the first sampling voltage is greater than or equal to the absolute value of the second sampling voltage (in other words, the second difference is less than the first difference), the controller obtains, at the first moment of passing a preset duration, the first sampling voltage at the two terminals of R11 and the second sampling voltage at the two terminals of R21. If the absolute value of the first sampling voltage is still greater than or equal to the absolute value of the second sampling voltage at the first moment, in other words, the third difference between the absolute value of the second sampling voltage and the absolute value of the first sampling voltage is less than or equal to 0 at the first moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

The controller 203 obtains the first sampling voltage at the two terminals of R11 and the second sampling voltage at the two terminals of R21. When the absolute value of the first sampling voltage is greater than or equal to the absolute value of the second sampling voltage (in other words, the second difference is less than the first difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the absolute value of the first sampling voltage is still greater than or equal to the absolute value of the second sampling voltage at the second moment, in other words, the fourth difference between the absolute value of the second sampling voltage and the absolute value of the first sampling voltage is less than or equal to 0 at the second moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

When the target circuit 10 is working, the first sampling voltage is equal to the second sampling voltage, and the first sampling voltage and the second sampling voltage are less than 0, in other words, the first difference between the absolute value of the second sampling voltage and the absolute value of the first sampling voltage is equal to 0, the controller 203 obtains the first sampling voltage and the second sampling voltage. When the absolute value of the first sampling voltage is greater than the absolute value of the second sampling voltage, in other words, the second difference between the absolute value of the second sampling voltage and the absolute value of the first sampling voltage is less than the first difference, and the target circuit 10 is short-circuited, the controller separately outputs the PWM wave of the preset duty cycle to the gate of S1 and the gate of S2, so that S1 and S2 are off, and the target circuit 10 stops working.

Further, to prevent the short-circuit protection from being mistakenly triggered, the accuracy of performing short-circuit protection by the short-circuit protection apparatus 20 may be further improved by delaying or filtering.

Further, the controller 203 obtains the first sampling voltage at the two terminals of R11 and the second sampling voltage at the two terminals of R21. When the absolute value of the first sampling voltage is greater than the absolute value of the second sampling voltage (in other words, the second difference between the absolute value of the second sampling voltage and the absolute value of the first sampling voltage is less than the first difference), the controller obtains, at the first moment of passing a preset duration, the first sampling voltage at the two terminals of R11 and the second sampling voltage at the two terminals of R21. If the absolute value of the first sampling voltage is still greater than the absolute value of the second sampling voltage at the first moment, in other words, the third difference between the absolute value of the second sampling voltage and the absolute value of the first sampling voltage is less than 0 at the first moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

The controller 203 obtains the first sampling voltage at the two terminals of R11 and the second sampling voltage at the two terminals of R21. When the absolute value of the first sampling voltage is greater than the absolute value of the second sampling voltage (in other words, the second difference between the absolute value of the second sampling voltage and the absolute value of the first sampling voltage is less than the first difference), the controller filters the first sampling voltage and the second sampling voltage through software filtering, and obtains, at the second moment after the first sampling voltage and the second sampling voltage are filtered, the first sampling voltage at the two terminals of R11 and the second sampling voltage at the two terminals of R21. If the absolute value of the first sampling voltage is still greater than the absolute value of the second sampling voltage at the second moment, in other words, the fourth difference between the absolute value of the second sampling voltage and the absolute value of the first sampling voltage is less than 0 at the second moment, the first difference is greater than the third difference, and S1 and S2 are short-circuited, that is, the target circuit 10 is short-circuited, the controller separately outputs the PWM wave of the preset duty cycle to the gate of S1 and the gate of S2, so that S1 and S2 are off, and the target circuit 10 stops working.

Figure 9:
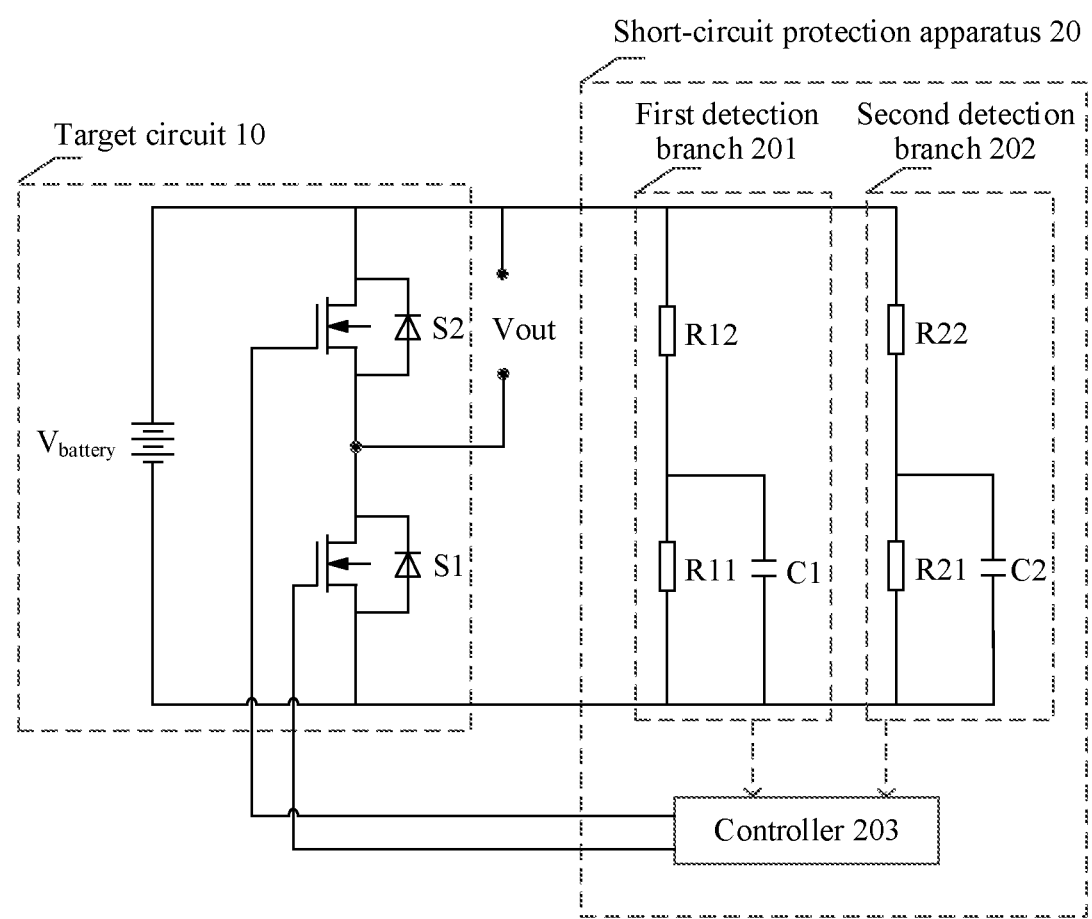
FIG. 9 is a schematic diagram of another structure of a short-circuit protection apparatus according to this disclosure.

Further, the second detection branch 202 shown in FIG. 8 may further include a second sampling capacitor that is connected in parallel to the second sampling resistor R21. For details, refer to a schematic diagram of another structure of a short-circuit protection apparatus shown in FIG. 9. As shown in FIG. 9, the second detection branch 202 further includes the second sampling capacitor C2 connected in parallel to R21. The capacitance value of C2 is less than that of C1, to ensure that when S1 and S2 are short-circuited, the decrease in the first sampling voltage is less than the decrease in the second sampling voltage. Therefore, when S1 and S2 are short-circuited, the difference between the first sampling voltage and the second sampling voltage may be reversed to trigger the short-circuit protection. In addition, C2 may filter the spike voltage in the second sampling voltage at the two terminals of R21, to prevent the short-circuit protection from being mistakenly triggered due to the decreased spike voltage. This improves the accuracy of performing the short-circuit protection by the short-circuit protection apparatus 20, and improves the stability of the working device (for example, the power conversion device) in which the target circuit 10 and the short-circuit protection apparatus 20 are disposed. For description of the embodiment in which the controller 203 performs the short-circuit protection on the target circuit 10 based on the first sampling voltage and the second sampling voltage, refer to corresponding descriptions in the embodiment corresponding to FIG. 8. Details are not described herein again.

Figure 10:
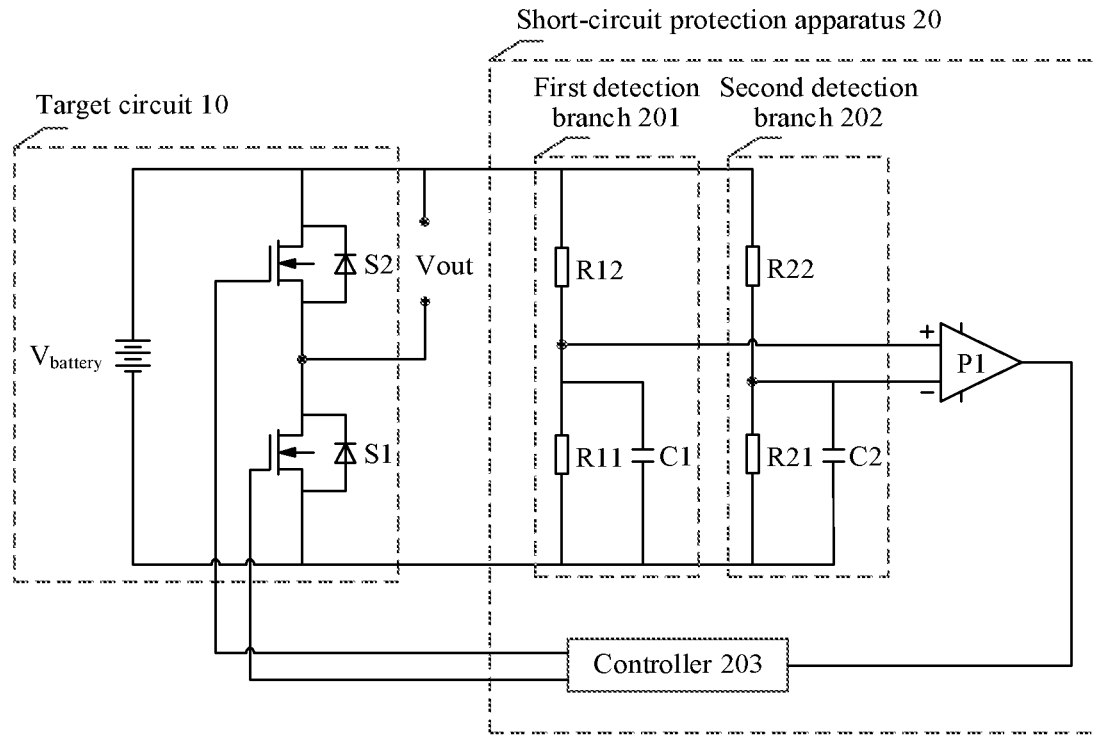
FIG. 10 is a schematic diagram of still another structure of a short-circuit protection apparatus according to this disclosure.

Further, the short-circuit protection apparatus 20 shown in FIG. 9 further includes the comparator. For details, refer to a schematic diagram of still another structure of a short-circuit protection apparatus shown in FIG. 10. As shown in FIG. 10, the short-circuit protection apparatus 20 further includes the comparator P1. The positive-phase input terminal of P1 is configured to collect the first sampling voltage V11 at the two terminals of R11, the inverse-phase input terminal is configured to collect the second sampling voltage V21 at the two terminals of R21, and the output terminal is connected to the controller 203 and configured to, when V11 is greater than or equal to V21, output the high-level signal, and when V11 is less than V21, output the low-level signal. It can be learned from a circuit structure shown in FIG. 10 that, when the target circuit 10 is working, V21 may be greater than V11 and greater than 0 (in other words, the first difference is greater than 0) by presetting the resistance values of R11, R12, R21, and R22. Therefore, the comparator P1 outputs the low-level signal when the target circuit 10 is working. Optionally, the positive-phase input terminal of P1 may also be configured to collect the second sampling voltage V21 at the two terminals of R21, and the negative-phase input terminal is configured to collect the first sampling voltage V11 at the two terminals of R11. This is not limited in this disclosure.

In an optional embodiment, the controller 203 obtains the level signal that is output by the comparator P1. When the level signal is the high-level signal, to be specific, V21 is less than or equal to V11, to be specific, the second difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

It may be understood that, because the decrease in the voltage at the two terminals of the target circuit 10 is faster than the increase in the short-circuit current, the target circuit 10 that is short-circuited may be quickly rectified in a timely manner, to perform the short-circuit protection on the target circuit 10. In addition, because the target circuit 10 is connected in parallel to the short-circuit protection apparatus 20, fast short-circuit protection performed by the short-circuit protection apparatus 20 is not affected by the inductance.

In another optional embodiment, the controller 203 obtains, at the first moment of passing a preset duration after the comparator P1 outputs the high-level signal, the level signal that is output by the comparator P1. If the level signal is still the high-level signal at the first moment, in other words, V21 is less than or equal to V11 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

In still another optional embodiment, the controller 203 obtains the level signal that is output by the comparator P1. When the level signal is the high-level signal, the controller filters the first sampling voltage and the second sampling voltage through software filtering, and obtains, at the second moment after the first sampling voltage and the second sampling voltage are filtered, the level signal that is output by the comparator P1. If the level signal is still the high-level signal at the second moment, in other words, V21 is less than or equal to V11 at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

It may be understood that, the short-circuit protection may not be mistakenly triggered by delaying or filtering in the last two embodiments corresponding to FIG. 10 in comparison with the first embodiment corresponding to FIG. 10, and this improves the accuracy of performing the short-circuit protection by the short-circuit protection apparatus 20, and improves the stability of the working device in which the target circuit 10 and the short-circuit protection apparatus 20 are disposed.

It should be noted that, when the first sampling voltage and the second sampling voltage are less than 0, the short-circuit protection apparatus can still perform the short-circuit protection on the target circuit 10.

When the target circuit 10 is working, and the second sampling voltage is less than the first sampling voltage and less than 0, in other words, and the first difference between the absolute value of the second sampling voltage and the absolute value of the first sampling voltage is greater than 0, the comparator P1 outputs the high-level signal. The controller 203 obtains the level signal that is output by the comparator P1. When the level signal is the low-level signal, to be specific, the first sampling voltage is less than the second sampling voltage and less than 0, in other words, the second difference is less than the first difference, and S1 and S2 are short-circuited, that is, the target circuit 10 is short-circuited, the controller separately outputs the PWM wave of the preset duty cycle output to the gate of S1 and the gate of S2, so that S1 and S2 are off.

Further, to prevent the short-circuit protection from being mistakenly triggered, the accuracy of performing the short-circuit protection by the short-circuit protection apparatus 20 may be further improved by delaying or filtering.

Further, the controller 203 obtains, at the first moment of passing a preset duration after the comparator P1 outputs the low-level signal, the level signal that is output by the comparator P1. If the level signal is still the low-level signal at the first moment, in other words, the first sampling voltage is still less than the second sampling voltage and less than 0 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

The controller 203 obtains the level signal that is output by the comparator P1. When the level signal is the low-level signal, the controller filters the first sampling voltage and the second sampling voltage through software filtering, and obtains, at the second moment after the first sampling voltage and the second sampling voltage are filtered, the level signal that is output by the comparator P1. If the level signal is still the low-level signal at the second moment, in other words, the first sampling voltage is still less than the second sampling voltage and less than 0 at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

When the target circuit 10 is working, the second sampling voltage is equal to the first sampling voltage, and the first sampling voltage and the second sampling voltage are less than 0, in other words, the first difference between the absolute value of the second sampling voltage and the absolute value of the first sampling voltage is equal to 0, the comparator P1 outputs the high-level signal. The controller 203 obtains the level signal that is output by the comparator P1. When the level signal is the low-level signal, to be specific, the first sampling voltage is less than the second sampling voltage and less than 0, in other words, the second difference is less than the first difference, and S1 and S2 are short-circuited, the controller separately outputs the PWM wave of the preset duty cycle to the gate of S1 and the gate of S2, so that S1 and S2 are off.

Further, to prevent the short-circuit protection from being mistakenly triggered, the accuracy of performing the short-circuit protection by the short-circuit protection apparatus 20 may be further improved by delaying or filtering.

Further, the controller 203 obtains, at the first moment of passing a preset duration after the comparator P1 outputs the low-level signal, the level signal that is output by the comparator P1. If the level signal is still the low-level signal at the first moment, in other words, the first sampling voltage is still less than the second sampling voltage and less than 0 at the first moment, in other words, the third difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

The controller 203 obtains the level signal that is output by the comparator P1. When the level signal is the low-level signal, the controller filters the first sampling voltage and the second sampling voltage through software filtering, and obtains, at the second moment after the first sampling voltage and the second sampling voltage are filtered, the level signal that is output by the comparator P1. If the level signal is still the low-level signal at the second moment, in other words, the first sampling voltage is still less than the second sampling voltage and less than 0 at the second moment, in other words, the fourth difference is less than the first difference, and S1 and S2 are short-circuited, that is, the target circuit 10 is short-circuited, the controller separately outputs the PWM wave of the preset duty cycle to the gate of S1 and the gate of S2, so that S1 and S2 are off.

Figure 11:
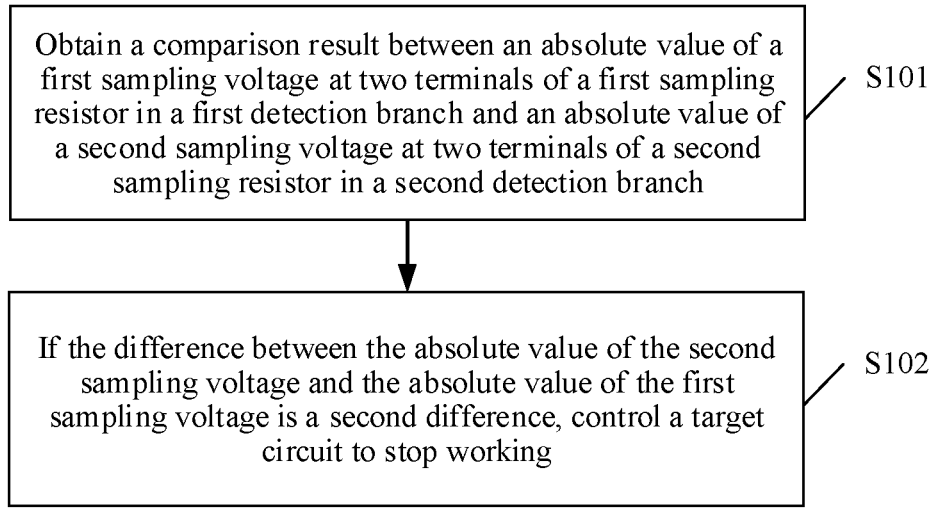
FIG. 11 is a flowchart of a short-circuit protection method for a target circuit according to this disclosure.

Refer to FIG. 11. FIG. 11 is a flowchart of a short-circuit protection method for a target circuit according to this disclosure. The short-circuit protection method for a target circuit provided in this embodiment of this disclosure is applicable to the controller 203 in the short-circuit protection apparatus 20 shown in FIG. 3 to FIG. 10. The short-circuit protection method for a target circuit may include the following steps.

S101: Obtain a comparison result between an absolute value of a first sampling voltage at two terminals of a first sampling resistor in a first detection branch and an absolute value of a second sampling voltage at two terminals of a second sampling resistor in a second detection branch.

The first detection branch is connected in parallel to a first terminal and a second terminal of the target circuit, and the second detection branch is connected in parallel to the first terminal and the second terminal of the target circuit. The first detection branch includes the first sampling resistor and a first sampling capacitor that is connected in parallel to the first sampling resistor. The second detection branch includes a second sampling resistor. When the target circuit is working, a difference between the absolute value of the second sampling voltage at the two terminals of the second sampling resistor and the absolute value of the first sampling voltage at the two terminals of the first sampling resistor is a first difference.

In an optional implementation, the controller obtains the first sampling voltage at the two terminals of the first sampling resistor and the second sampling voltage at the two terminals of the second sampling resistor, and compares the absolute value of the first sampling voltage with the absolute value of the second sampling voltage, to obtain the comparison result between the absolute values of the first sampling voltage and the second sampling voltage.

In another optional implementation, the controller obtains an electrical signal that is output by a comparator. A first input terminal of the comparator is configured to collect the first sampling voltage at the two terminals of the first sampling resistor, and a second input terminal is configured to collect the second sampling voltage at the two terminals of the second sampling resistor. The comparator is configured to output a first level signal when the first sampling voltage is less than the second sampling voltage, and output a second level signal when the first sampling voltage is greater than or equal to the second sampling voltage.

S102: if the difference between the absolute value of the second sampling voltage and the absolute value of the first sampling voltage is a second difference, control the target circuit to stop working.

The first difference is greater than the second difference. The target circuit includes one switching device or a plurality of switching devices that are connected in series. The switching device includes a power tube (such as a MOSFET, an IGBT, or a triode), a relay, or a contactor.

In an optional implementation, when the first difference is greater than the second difference, the controller controls each switching device in the target circuit to be off.

In another optional implementation, when a level signal that is output by the comparator is the second level signal, the controller controls each switching device in the target circuit to be off.

In a specific implementation, for more operations performed by the controller in the short-circuit protection method for a target circuit provided in this disclosure, refer to the short-circuit protection apparatus 20 shown in FIG. 3 to FIG. 10 and the implementations performed by the controller 203 based on working principles of the short-circuit protection apparatus 20. Details are not described herein again.

It should be noted that the controller 203 in the short-circuit protection apparatus 20 provided in this disclosure may be an existing controller in a device (for example, a power conversion device) in which the target circuit 10 and the short-circuit protection apparatus 20 are disposed, or may be another controller that is independent of the existing controller in the device in which the target circuit 10 and the short-circuit protection apparatus 20 are disposed. This is not limited in this disclosure.

In this disclosure, the short-circuit protection apparatus that is connected in parallel to the target circuit can quickly rectify the short-circuit fault in a timely manner, to effectively protect the target circuit, so that applicability is high.

The foregoing descriptions are merely specific implementations of this disclosure, but are not intended to limit the protection scope of this disclosure. Any variation method readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. A short-circuit protection apparatus comprising:
    a first detection branch coupled in parallel to a first terminal of a target circuit and a second terminal of the target circuit, wherein the first detection branch comprises:
        a first sampling resistor, wherein a first sampling voltage is measured across the first sampling resistor; and
        a first sampling capacitor coupled in parallel to the first sampling resistor;
    a second detection branch coupled in parallel to the first terminal and the second terminal and comprising a second sampling resistor, wherein a second sampling voltage is measured across the second sampling resistor, and wherein when the target circuit is working, a difference between a second absolute value of the second sampling voltage and a first absolute value of the first sampling voltage is a first difference; and a controller coupled to the first detection branch and the second detection branch and configured to:

obtain a comparison result between the first absolute value and the second absolute value; and control the target circuit to stop working when the difference between the second absolute value and the first absolute value is a second difference, wherein the first difference is greater than the second difference.

2. The short-circuit protection apparatus of claim 1, wherein the second detection branch further comprises a second sampling capacitor coupled in parallel to the second sampling resistor, and wherein a second capacitance value of the second sampling capacitor is less than a first capacitance value of the first sampling capacitor.

3. The short-circuit protection apparatus of claim 1, wherein the first detection branch comprises a first pair of two resistors connected in series, wherein the first pair of two resistors comprise the first sampling resistor and a third sampling resistor, wherein a first terminal of the third sampling resistor is connected to the first terminal of the target circuit, wherein a second terminal of the third sampling resistor is connected to a first terminal of the first sampling resistor, and wherein a second terminal of the first sampling resistor is connected to the second terminal of the target circuit.

4. The short-circuit protection apparatus of claim 3, wherein the second detection branch comprises a second pair of two resistors connected in series, wherein the second pair of two resistors comprise the second sampling resistor and a fourth sampling resistor, wherein the first terminal of the target circuit is connected to the second terminal of the target circuit by the fourth sampling resistor and the second sampling resistor, and wherein a first ratio of a resistance value of the fourth sampling resistor to a resistance value of the second sampling resistor is less than or equal to a second ratio of a resistance value of the third sampling resistor to a resistance value of the first sampling resistor.

5. The short-circuit protection apparatus of claim 1, further comprising a comparator, wherein the comparator comprises:

a first input terminal configured to collect the first sampling voltage;

a second input terminal configured to collect the second sampling voltage;

an output terminal coupled to the controller, wherein the comparator is configured to:

output an output signal at a first level when the first sampling voltage is less than the second sampling voltage; and output the output signal at a second level when the first sampling voltage is greater than or equal to the second sampling voltage, and wherein the controller is configured to:

obtain the output signal from the comparator; and control the target circuit to stop working when the output signal is the second level.

6. The short-circuit protection apparatus of claim 1, wherein the controller is further configured to:

obtain the comparison result at a first moment after a preset duration elapses when the difference between the second absolute value of the second sampling voltage and the first absolute value of the first sampling voltage is the second difference; and control the target circuit to stop working, when the difference between the second absolute value of the second sampling voltage and the first absolute value of the first sampling voltage is a third difference, wherein the first difference is greater than the third difference.

7. The short-circuit protection apparatus of claim 1, wherein the controller is further configured to control a switching device in the target circuit to be off.

8. A short-circuit protection method for a target circuit, wherein the short-circuit protection method comprises:

obtaining a comparison result between a first absolute value of a first sampling voltage at first two terminals of a first sampling resistor in a first detection branch and a second absolute value of a second sampling voltage at second two terminals of a second sampling resistor in a second detection branch, wherein the first detection branch is connected in parallel to a first terminal of the target circuit and a second terminal of the target circuit and comprises the first sampling resistor and a first sampling capacitor connected in parallel to the first sampling resistor, wherein the second detection branch is connected in parallel to the first terminal and the second terminal and comprises the second sampling resistor, wherein when the target circuit is working, a difference between the second absolute value and the first absolute value is a first difference; and controlling the target circuit to stop working when a difference between the second absolute value and the first absolute value is a second difference, wherein the first difference is greater than the second difference.

9. The short-circuit protection method of claim 8, wherein the second detection branch further comprises a second sampling capacitor connected in parallel to the second sampling resistor, and wherein a capacitance value of the second sampling capacitor is less than a capacitance value of the first sampling capacitor.

10. The short-circuit protection method of claim 8, wherein the first detection branch comprises a first pair of two resistors connected in series, wherein the first pair of two resistors comprise the first sampling resistor and a third sampling resistor, wherein a first terminal of the third sampling resistor is connected to the first terminal of the target circuit, wherein a second terminal of the third sampling resistor is connected to a first terminal of the first sampling resistor, and wherein a second terminal of the first sampling resistor is connected to the second terminal of the target circuit.

11. The short-circuit protection method of claim 10, wherein the second detection branch comprises a second pair of two resistors connected in series, wherein the second pair of two resistors comprise the second sampling resistor and a fourth sampling resistor, wherein the first terminal of the target circuit is connected to the second terminal of the target circuit by the fourth sampling resistor and the second sampling resistor, and wherein a first ratio of a resistance value of the fourth sampling resistor to a resistance value of the second sampling resistor is less than or equal to a second ratio of a resistance value of the third sampling resistor to a resistance value of the first sampling resistor.

12. The short-circuit protection method of claim 8, wherein obtaining the comparison result further comprises:

collecting, using a first input terminal of a comparator, the first sampling voltage;

collecting, using a second input terminal of the comparator, the second sampling voltage;

outputting, using an output terminal of the comparator, an output signal at a first level when the first sampling voltage is less than the second sampling voltage;

outputting, using the output terminal, the output signal at a second level when the first sampling voltage is greater than or equal to the second sampling voltage; and controlling the target circuit to stop working when the output signal is the second level.

13. The short-circuit protection method of claim 8, wherein controlling the target circuit to stop working further comprises:

obtaining the comparison result at a first moment after a preset duration elapses when the difference between the first absolute value and the second absolute value is the second difference; and controlling the target circuit to stop working, when the difference between the second absolute value of the second sampling voltage and the first absolute value of the first sampling voltage is a third difference, wherein the first difference is greater than the third difference.

14. The short-circuit protection method of claim 8, wherein controlling the target circuit to stop working comprises controlling a switching device in the target circuit to be off.

15. A power conversion device comprising:

a target circuit comprising a first terminal and a second terminal; and a short-circuit protection apparatus comprising:
  a first detection branch coupled in parallel to the target circuit and comprising:
    a first sampling resistor, wherein a first sampling voltage is measured across the first sampling resistor; and
    a first sampling capacitor coupled in parallel to the first sampling resistor;
  a second detection branch coupled in parallel to the target circuit and comprising a second sampling resistor, wherein a second sampling voltage is measured across the second sampling resistor, and
  wherein when the target circuit is working, a difference between a second absolute value of the second sampling voltage and a first absolute value of the first sampling voltage is a first difference; and
  a controller coupled to the first detection branch and the second detection branch and configured to:
    obtain a comparison result between the first absolute value and the second absolute value; and
    control the target circuit to stop working when the comparison result is a second difference, wherein the first difference is greater than the second difference.

16. The power conversion device of claim 15, wherein the second detection branch further comprises a second sampling capacitor coupled in parallel to the second sampling resistor, and wherein a capacitance value of the second sampling capacitor is less than a capacitance value of the first sampling capacitor.

17. The power conversion device of claim 15, wherein the first detection branch comprises a first pair of two resistors connected in series, wherein the first pair of two resistors comprise the first sampling resistor and a third sampling resistor, wherein a first terminal of the third sampling resistor is connected to the first terminal of the target circuit, wherein a second terminal of the third sampling resistor is connected to a first terminal of the first sampling resistor, and wherein a second terminal of the first sampling resistor is connected to the second terminal of the target circuit.

18. The power conversion device of claim 17, wherein the second detection branch comprises a second pair of two resistors connected in series, wherein the second pair of two resistors comprise the second sampling resistor and a fourth sampling resistor, wherein the first terminal of the target circuit is connected to the second terminal of the target circuit by the fourth sampling resistor and the second sampling resistor in series, and wherein a first ratio of a resistance value of the fourth sampling resistor to a resistance value of the second sampling resistor is less than or equal to a second ratio of a resistance value of the third sampling resistor to a resistance value of the first sampling resistor.

19. The power conversion device of claim 15, further comprising a comparator, wherein the comparator comprises:

a first input terminal configured to collect the first sampling voltage;

a second input terminal configured to collect the second sampling voltage;

an output terminal coupled to the controller, wherein the comparator is configured to:
  output an output signal at a first level when the first sampling voltage is less than the second sampling voltage; and
  output the output signal at a second level when the first sampling voltage is greater than or equal to the second sampling voltage, and wherein the controller is configured to:
  obtain the output signal from the comparator; and
  control the target circuit to stop working when the output signal is the second level.

20. The power conversion device of claim 15, wherein the controller is further configured to:

obtain the comparison result at a first moment after a preset duration elapses when the difference between the second absolute value of the second sampling voltage and the first absolute value of the first sampling voltage is the second difference; and control the target circuit to stop working, when the difference between the second absolute value of the second sampling voltage and the first absolute value of the first sampling voltage is a third difference, wherein the first difference is greater than the third difference.

* * * * *